A. R. TATTERSALL.
CENTRIFUGAL DRESSER.
APPLICATION FILED MAY 31, 1912.
1,037,839.
Patented Sept. 3, 1912.
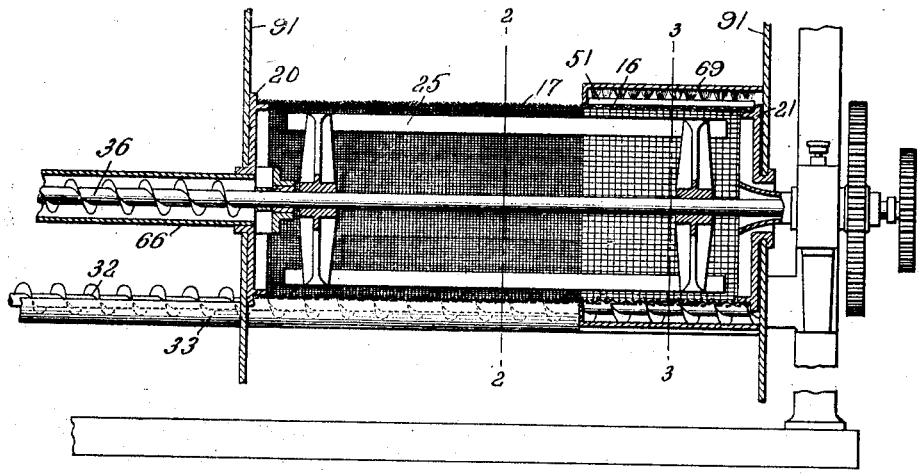
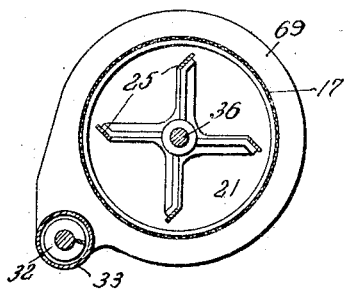
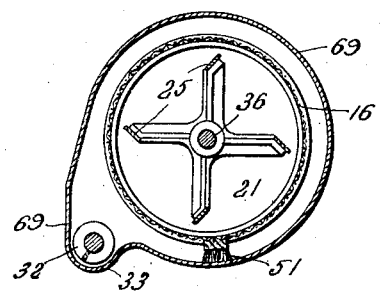
Witnesses
H. G. Robinette
J. J. Mawhinney
Inventor
Alfred R. Tattersall
By Meyers, Cushman & Rea
Attorney

UNITED STATES PATENT OFFICE.

ALFRED RISHWORTH TATTERSALL, OF LONDON, ENGLAND.

CENTRIFUGAL DRESSER.

1,037,839. Specification of Letters Patent. Patented Sept. 3, 1912.

Original application filed September 25, 1909, Serial No. 519,594. Divided and this application filed May 31, 1912. Serial No. 700,751.

*To all whom it may concern:*

Be it known that I, ALFRED R. TATTERSALL, a subject of the King of Great Britain, residing at London, England, have invented new and useful Improvements in Centrifugal Dressers, of which the following is a specification.

This invention relates to mills, more especially to an improvement in the bolting reel or centrifugal dresser disclosed in Letters Patent of Great Britain, granted to me the second day of June, 1904, No. 12,492, constitutes a divisional application of the parent application filed September 25, 1909, Serial No. 519,594 for an apparatus for making flour and meal, and this application corresponds in part to the Letters Patent of Great Britain No. 23,836 of 1909 granted me for the subject matter of the above noted parent application.

Among the objects of this invention is to provide a bolting reel or centrifugal dresser for flour mills and the like, with novel means for delivering a product to the central portion of the dresser, for separating the flour out as a finished product, to collect the tailings and deliver the same as a finished product, and to collect and discharge the residue for further reduction.

Another object of this invention is to provide a rotating centrifugal dresser or bolting reel with a scalper or cut-off at its finishing end; to provide a stationary solid casing about the scalper; to provide the casing with a discharge mouth; to provide a conveyer in the discharge mouth to carry off the throughs of the scalper; and to provide a brush on the outside of the scalper for movement in the casing to sweep said throughs into the discharge mouth.

Other objects and advantages of the invention will be pointed out in the following specification, and will be disclosed in the present embodiment of the invention shown in the annexed drawing, in which—

Figure 1 is a longitudinal central section through the bolting reel or centrifugal dresser; Fig. 2 is a transverse section through the same on the line 2—2 of Fig. 1; Fig. 3 is a transverse section on the line 3—3 of Fig. 1.

In Fig. 1 of the accompanying drawing the improved bolting reel or centrifugal dresser is disclosed as supported by and arranged between the walls 91 of a chamber in a flour mill, such as is disclosed in the parent application above referred to.

A pair of heads or casings 20 and 21 are disposed against the inner opposite faces of the walls 91 and support the frame of the dresser which is formed of metal bars covered with silk or wire in the usual way.

Leading into the left end of the chamber through the walls 91 is a feed tube or trough 66 in which is located a screw conveyer 36 adapted to conduct the tailings in the mill through the head 20 into the centrifugal dresser or bolt 25. Under the action of the dresser 25 the flour intermingled with the tailings is discharged through the meshing 17 as the tailings pass toward the finishing end of the reel. At the finishing end of the reel a scalper or cut-off 16 is formed by a relatively open or larger mesh, and the scalper 16 is inclosed in a stationary imperforate casing 69 carried, preferably, upon the inner side of the wall 91 of the chamber.

As will be observed particularly from Figs. 2 and 3 of the drawing, the casing 69 is provided at one side with a mouth or pocket formed at substantially a tangent to the casing and extending the entire length thereof for receiving the residue or throughs of the scalper. At one side of the scalper a longitudinal brush 51 is mounted for movement with the scalper to sweep against the inner wall of the casing 69 and collect the throughs into the mouth. From the mouth of the casing a trough 33 extends, the same passing entirely across the chamber and through the opposite or left end wall 91, and beyond said wall to any desired point of discharge within the mill. A screw conveyer 32 is located in the trough 33 and extends through the mouth of the casing 69, and collects and carries off the throughs or residue from the chamber into an adjacent mechanism of the mill.

It will be understood that the bolting reel herein shown is described in connection with the mill for making flour and meal as set out in the parent application above referred to, but that this construction may be utilized in any adaptable form of mill or device in which this peculiar form of bolting reel or centrifugal dresser may be employed.

The central shaft of the centrifugal dresser 25 is preferably utilized in supporting and operating the screw conveyer 36 located in the feeding tube or trough 66, while the carrying-off screw conveyer 32 is mounted upon an independent shaft which is suitably geared to the mechanism of the mill, as disclosed.

It will, of course, be understood that various modifications may be resorted to in the specific construction of the details of this bolting reel or centrifugal dresser without departing from the spirit of this invention, provided that such modifications be within the spirit of the appended claim.

What I claim is:

In a centrifugal dresser for a self-contained flour mill, a rotating centrifugal dresser having a scalper at its finishing end, an imperforate stationary casing surrounding the scalper and having a discharge mouth, and a brush secured to the outside of the scalper to sweep the throughs of the said scalper through the discharge mouth.

In testimony whereof I have hereunto set my hand in presence of two subscribing witnesses.

ALFRED RISHWORTH TATTERSALL.

Witnesses:
  THOMAS BIRKS,
  ARCHIBALD S. WADE.